(12) United States Patent
Xie et al.

(10) Patent No.: US 9,733,535 B2
(45) Date of Patent: Aug. 15, 2017

(54) ARRAY SUBSTRATE, LIQUID CRYSTAL DISPLAY PANEL AND DISPLAY DEVICE

(71) Applicant: BOE TECHNOLOGY GROUP CO., LTD., Beijing (CN)

(72) Inventors: Chang Xie, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/128,035

(22) PCT Filed: Nov. 12, 2012

(86) PCT No.: PCT/CN2012/084458
§ 371 (c)(1),
(2) Date: Dec. 20, 2013

(87) PCT Pub. No.: WO2013/163870
PCT Pub. Date: Nov. 7, 2013

(65) Prior Publication Data
US 2014/0146255 A1  May 29, 2014

(30) Foreign Application Priority Data

May 4, 2012 (CN) .......................... 2012 1 0138048

(51) Int. Cl.
*G02F 1/1362* (2006.01)
*G02F 1/1343* (2006.01)

(52) U.S. Cl.
CPC .... *G02F 1/13624* (2013.01); *G02F 1/134363* (2013.01)

(58) Field of Classification Search
CPC ........... G02F 1/134363; G02F 1/13624; G02F 2001/134372; G02F 2001/134381
(Continued)

(56) References Cited

U.S. PATENT DOCUMENTS 6,292,245 B1    9/2001  Lee et al.
7,656,492 B2 *  2/2010  Park ................. G02F 1/134363
                                                        349/141
(Continued)

FOREIGN PATENT DOCUMENTS

CN   1341308 A   3/2002
CN   1797144 A   7/2006
(Continued)

OTHER PUBLICATIONS

International Search Report (Chinese language) issued by the International Searching Authority ("ISA") on Jan. 31, 2013 for PCT/CN2012/084458, 11 pages.
(Continued)

*Primary Examiner* — Dung Nguyen
(74) *Attorney, Agent, or Firm* — Ladas & Parry LLP

(57) ABSTRACT

An array substrate comprises: a substrate; and a plurality of gate lines (101) and a plurality of data lines (102), which are formed on the substrate. Two adjacent gate lines (101) and two adjacent data lines (102) intersect with each other to form a pixel region. Each pixel region comprises two pixel electrodes (103) and two thin-film transistors (TFTs). The drain electrodes of two thin-film transistors (TFTs) are respectively connected to two pixel electrodes (103), the source electrodes of two thin-film transistors (TFTs) are respectively connected to two data lines, and the gate electrodes of two thin-film transistors (TFTs) are connected to one of two gate lines.

11 Claims, 3 Drawing Sheets

(58) Field of Classification Search
USPC .............................................. 349/37, 48, 141
See application file for complete search history.

(56) References Cited

U.S. PATENT DOCUMENTS

| | | | |
|---|---|---|---|
| 9,478,566 B2* | 10/2016 | Liu ................... | G02F 1/134363 |
| 2001/0045556 A1 | 11/2001 | Hirakata et al. | |
| 2002/0176030 A1* | 11/2002 | Matsumoto ........... | G02F 1/1345 349/43 |
| 2005/0151912 A1* | 7/2005 | Miyachi ............ | G02F 1/133753 349/141 |
| 2009/0174854 A1* | 7/2009 | Park .................. | G02F 1/134363 349/141 |
| 2010/0103085 A1 | 4/2010 | Lee et al. | |
| 2010/0225839 A1* | 9/2010 | Kim et al. ...................... | 349/38 |
| 2010/0296015 A1 | 11/2010 | Kim et al. | |

FOREIGN PATENT DOCUMENTS

| | | |
|---|---|---|
| CN | 101424852 A | 5/2009 |
| CN | 101726893 A | 6/2010 |
| CN | 101893796 A | 11/2010 |
| CN | 101991453 A | 3/2011 |
| CN | 102187270 A | 9/2011 |
| CN | 102201215 A | 9/2011 |
| GB | 2421832 A | 7/2006 |
| WO | 2010041491 A1 | 4/2010 |

OTHER PUBLICATIONS

International Preliminary Report on Patentability issued by the International Bureau of WIPO on May 13, 2014 for PCT/CN2012/084485, 8 pages.
First Office Action (Chinese language) issued by the State Intellectual Property Office ("SIPO") on May 14, 2014 for application No. 201210138048.X, 7 pages.
English translation of first Office Action (listed above) issued by the State Intellectual Property Office ("SIPO") for application No. 201210138048.X, 6 pages.
English abstract of CN 101726893A, listed above, 2 pages.
English abstract of CN 101893796A, listed above, 2 pages.
English abstract of CN 1797144A, listed above, 1 page.
International Preliminary Report on Patentability issued by the International Bureau of WIPO on Nov. 4, 2014 for PCT/CN2012/084458, 7 pages.
English abstract of CN 101991453A, listed above, 2 pages.
English abstract of CN 102201215A, listed above, 1 page.
English abstract of CN 102187270A, listed above, 1 page.
English abstract of WO 2010041491, listed above, 2 pages.
English abstract of CN 101424852A, listed above, 2 pages.
English abstract of CN 1341308A, listed above, 1 page.
Second Office Action (Chinese language) issued by the State Intellectual Property Office ("SIPO") on Dec. 31, 2014 for application No. 201210138048.X, 8 pages.
English translation of Second Office Action (listed above) issued by the State Intellectual Property Office ("SIPO") for application No. 201210138048.X, 8 pages.
Third Chinese Office Action Appln. No. 201210138048.X; Dated May 25, 2015.
Extended European Search Report Appln. No. 12875825.7-1904 / 2846184 PCT/CN2012084458; Dated Nov. 17, 2015.
Fourth Chinese Office Action Appnl. No. 201210138048.X; Nov. 9, 2015.
EPO Communication dated Oct. 31, 2016; Appln. No. 12 875 825.7-1904.

* cited by examiner

ARRAY SUBSTRATE, LIQUID CRYSTAL DISPLAY PANEL AND DISPLAY DEVICE

CROSS REFERENCE TO RELATED APPLICATIONS

This application is based on International Application No. PCT/CN2012/084458 filed on Nov. 12, 2012, which claims priority to Chinese National Application No. 201210138048.X filed on May 4, 2012, the contents of which are incorporated herein by reference.

TECHNICAL FIELD

Embodiments of the present invention relate to an array substrate, a liquid crystal panel and a display device.

BACKGROUND

Liquid crystal displays are widely used as displays for TVs and computers due to its advantages of light weight, low irradiation and portability.

A liquid crystal display includes various modes such as In-Plane Switching (IPS) liquid crystal panel and Fringe-Field Switching (FFS) liquid crystal panel. A liquid crystal panel includes an array substrate, a color filter substrate and a liquid crystal layer encapsulated between the array substrate and the color filter substrate. FIG. 1 is a structural representation of an array substrate in an IPS liquid crystal panel of prior art. As illustrated in FIG. 1, the array substrate in an IPS liquid crystal panel in the art of state includes a substrate (not illustrated in the figure), gate lines 101, data lines 102, pixel electrodes 103, common electrodes 104, common electrode lines 105 and thin film transistors (TFTs); and the sources and drains of the TFTs are connected with the data lines 102 and pixel electrodes 103 respectively, the gates of the TFTs are connected with the gate lines (or scan lines) 101 respectively, and the common electrodes 104 are connected with the common electrode lines 105. Turning on or off of the TFTs is controlled by gate drivers in the liquid crystal panel. When a TFT is turned on, a data signal, which is an alternating voltage, is applied onto a pixel electrode 103 through a source driver, and a constant voltage Vcom is applied onto a common electrode 104. The constant voltage Vcom is of a value between a high potential in a positive period and a low potential in a negative period of the alternating voltage applied onto the pixel electrode 103 to form an electric field, between the pixel electrode 103 and the common electrode 104, that can control alignment direction of liquid crystal molecules in the liquid crystal layer. The constant voltage is generally of an intermediate value between the high potential in the positive period and the low potential in the negative period of the alternating voltage.

FIG. 2 is a voltage signal diagram on a pixel electrode and a common electrode in the art of state. As illustrated in FIG. 2, in the figure, Vg denotes a scan signal output from the gate driver, Vp denotes an actual alternating voltage on the pixel electrode 103, Vp' denotes an object alternating voltage applied onto the pixel electrode 103, where $\Delta Vp=Vp'-Vp$. In the art of state, when a gate driver in the liquid crystal panel turns on the TFT connected with a pixel electrode 103, a source driver in the liquid crystal panel applies an alternating voltage to the pixel electrode 103, that is, charges the pixel electrode 103. Since the TFT in the array substrate further includes some parasitic capacitance, the source driver will charge these parasitic capacitors at the same time, which will generate coupling capacitance. When the gate driver in the liquid crystal panel turns off the TFT connected with the pixel electrode 103, the source driver stops charging the pixel electrode 103. The gate driver causes the voltage drop (typically 30~40V) generated when the TFT is turned off to be fed back to the pixel electrode 103 through the coupling capacitance, resulting in a voltage drop of $\Delta Vp$ on the pixel electrode 103. Since the voltage applied onto the common electrode 104 is a constant voltage, but there will be a voltage drop of $\Delta Vp$ on the pixel electrode 103 both in a positive period and a negative period of the alternating voltage, the voltage value on the pixel electrode 103 become non-symmetric with respect to the constant voltage applied onto the common electrode 104, thereby influencing the gray scale values of the displayed image, leading to image retention. Meanwhile, some charged ions remain in the liquid crystal layer during the fabrication of a liquid crystal panel, which will accumulate nearby an alignment layer under the effect of an electric field, thus when the liquid crystal panel displays the next frame image, the electric field in the liquid crystal layer will change, while the electric field generated by residuary charged ions in the liquid crystal layer cannot be rapidly changed accordingly. The electric field generated by residuary charged ions causes the liquid crystal panel to display the previous frame of image still, resulting in even severer image retention.

SUMMARY

One embodiment of the present invention provides an array substrate including: a substrate; and a plurality of gate lines and a plurality of data lines formed on the substrate, two adjacent gate lines and two adjacent data lines intersecting each other to form a pixel region, wherein each the pixel region comprises two pixel electrodes and two thin film transistors (TFTs), drains of the two thin film transistors are connected with the two pixel electrodes respectively, sources of the two thin film transistors are connected with the two data lines respectively, and gates of the two thin film transistors are connected with one of the two gate lines.

Another embodiment of the present invention provides a liquid crystal panel including: an array substrate, a color filter substrate and a liquid crystal layer encapsulated between the array substrate and the color filter substrate, the array substrate including: a plurality of gate lines and a plurality of data lines, two adjacent gate lines and two adjacent data lines intersecting each other to form one pixel region; source drivers connected with the data lines; and Gate drivers connected with the gate lines, wherein each the pixel region comprises two pixel electrodes and two thin film transistors (TFTs), drains of the two thin film transistors are connected with the two pixel electrodes respectively, sources of the two thin film transistors are connected with the two data lines respectively, and gates of the two thin film transistors are connected with one of the two gate lines.

Another embodiment of the present invention provides a display device including the above-mentioned liquid crystal panel.

BRIEF DESCRIPTION OF THE DRAWINGS

For better understanding technical proposals according to embodiments of the present invention, drawings of the embodiments will be described briefly below. Obviously, drawings in the following description only relate to some embodiments of the present invention, not to limit the present invention.

DETAILED DESCRIPTION

In order to make the purpose, technology solution and advantages of embodiments of the present invention more clear, technology solutions according to embodiments of the present invention will be described clearly and completely below with respect to drawings of embodiments of the present invention. It is to be understood that the described embodiments are part of but not all of embodiments of the present invention. Based on the described embodiments of the present invention, all other embodiments obtained by those of ordinary skill in the art without any creative labor fall into the protecting scope of the present invention.

The embodiments of the present invention provide an array substrate, a liquid crystal panel and a display device to address the image retention problem that tends to occur when the liquid crystal panel in the art of state is displaying images. In order for one skilled in the art to better understand the technical proposal provided in the embodiments of the present invention, the array substrate, the liquid crystal panel and the display device provided in the embodiments of the present invention will be described in detail with reference to the accompanying drawings.

Figure 1:
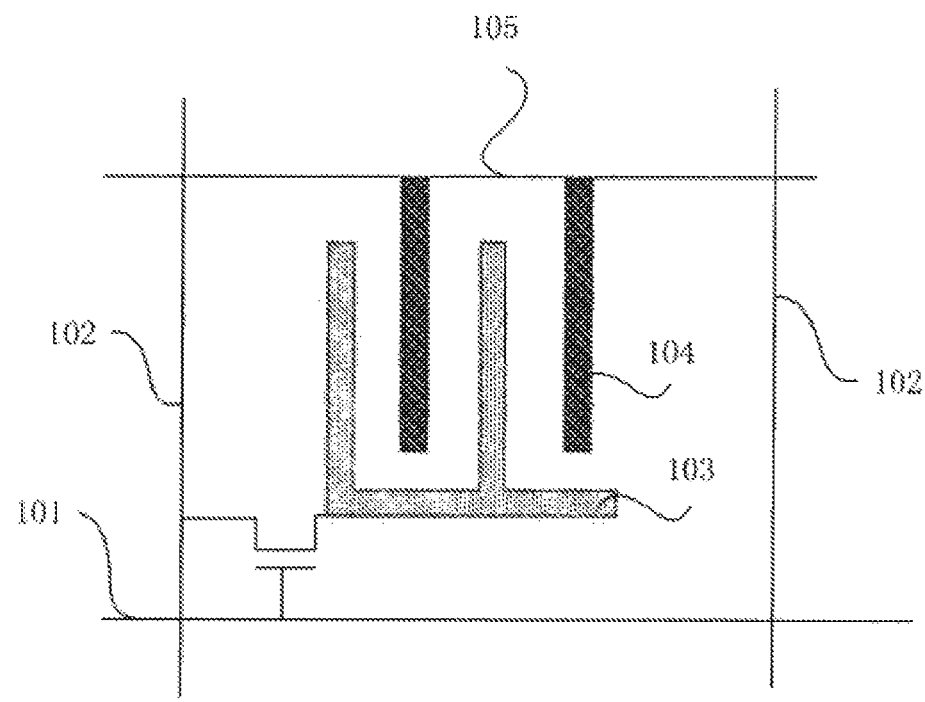
FIG. 1 is a structural representation of an array substrate in an IPS liquid crystal panel of the art of state.
Figure 2:
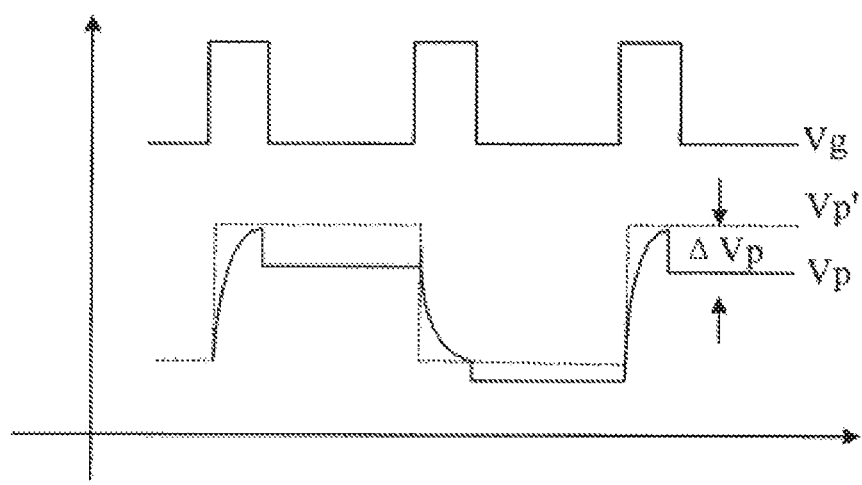
FIG. 2 is a voltage signal diagram on a pixel electrode and a common electrode of the art of state.
Figure 3:
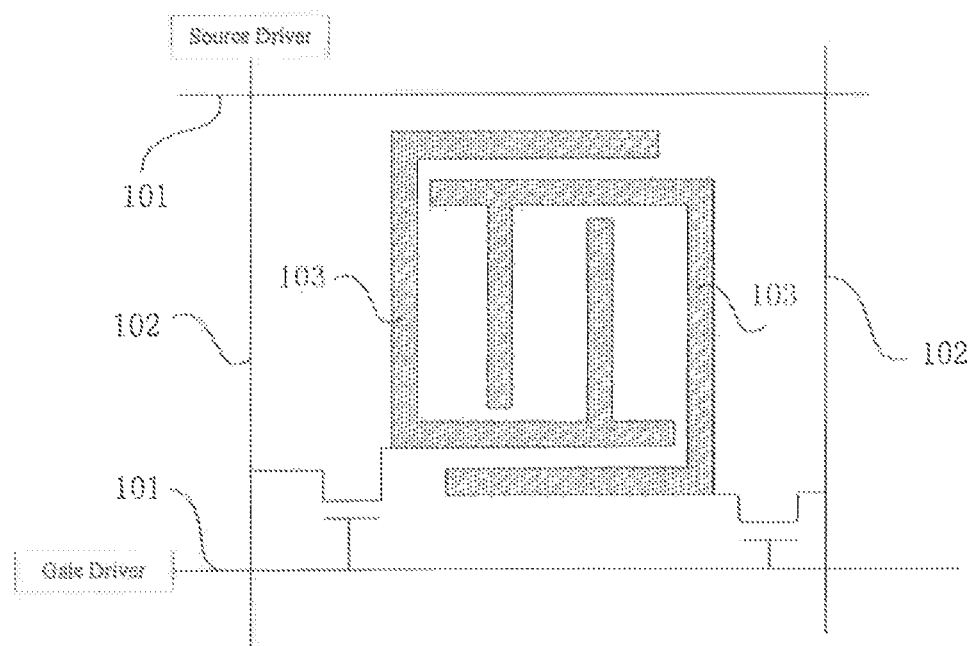
FIG. 3 is a structure schematic diagram of an array substrate provided in an embodiment of the present invention.

FIG. 3 is a structure schematic diagram of an array substrate provided in an embodiment of the present invention. As illustrated in FIG. 3, the array substrate in this embodiment includes a substrate (not shown) and gate drivers (not shown), source drivers (not shown), M gate lines 101, N data lines 102, and TFTs formed on the substrate; a gate driver is connected with a gate line 101, a source driver is connected with a data line 102, the gate driver outputs scan signals to the gate line 101, and the source driver outputs data signals to the data line 102. Adjacent two gate lines and adjacent two data lines intersect each other to form a pixel region, and M gate lines 101 and N data lines 102 intersect each other to form (M−1)×(N−1) pixel regions. Each pixel region includes two pixel electrodes 103 and two TFTs. Drains of the two TFTs are connected with two pixel electrodes 103 respectively, sources of the two TFTs are connected with adjacent two data lines 102 respectively, and two gates of the two TFTs are connected with one of two adjacent gate lines 101, namely, connected with same one gate line 101.

In this embodiment, in one pixel region, when the gate driver outputs a scan signal to the gate line 101 to turn on the two TFTs, the source driver will apply an alternating voltage to two adjacent data lines 102 of the pixel region respectively, causing the alternating voltages on the two adjacent data lines 102 to be in a positive period and a negative period respectively and accordingly the alternating voltages on the two pixel electrodes 103 in the pixel region to be also in a positive period and in a negative period respectively, thereby generating an electric field between the two pixel electrodes 103.

In an embodiment of the present invention, the pixel electrode 103 may be designed into a comb-tooth shape, and the two comb-tooth shaped pixel electrodes in one pixel region are disposed in an interleaving manner to enhance the strength of electric field between pixel electrodes 103. However, embodiments of the present invention are not limited thereto.

In an embodiment of the present invention, the pixel electrode 103 is generally formed of a transparent conductor material such as indium tin oxide or indium zinc oxide.

Figure 4:
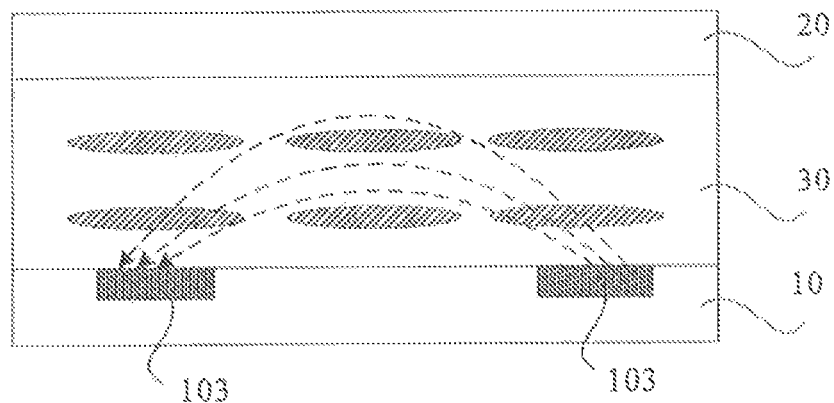
FIG. 4 is a structure schematic diagram of a liquid crystal panel provided in an embodiment of the present invention.
Figure 5:
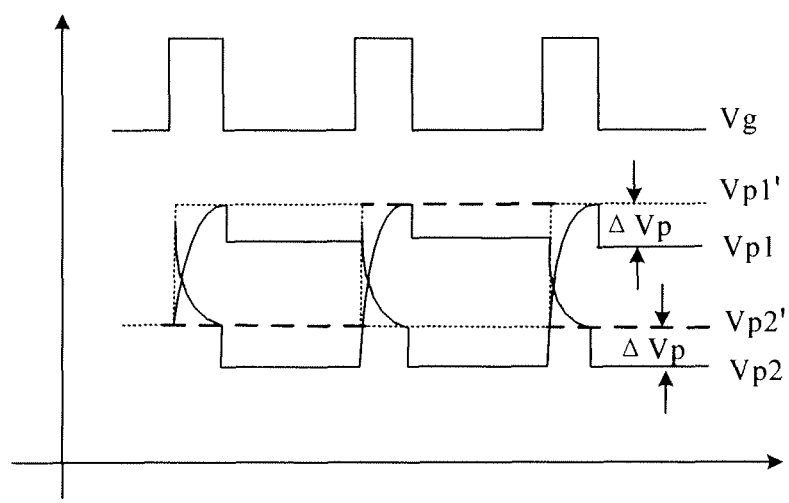
FIG. 5 is a diagram of the voltage signal applied onto the two pixel electrodes in FIG. 4.

FIG. 4 is a structure schematic diagram of a liquid crystal panel provided in an embodiment of the present invention; and FIG. 5 is a diagram of the voltage signal applied onto the two pixel electrodes in FIG. 4. As illustrated in FIG. 4, the liquid crystal panel of the present embodiment may include an array substrate 10, a color filter substrate 20 and a liquid crystal layer 30 encapsulated between the array substrate 10 and the color filter substrate 20. The data lines on the array substrate 10 are connected with source drivers to receive data signals, and the gate lines on the array substrate 20 are connected with gate drivers to receive scanning signals. For the convenience of explanation, the structure illustrated in FIG. 3 may be used for the array substrate 10 in the liquid crystal panel of the present embodiment; however embodiments of the present invention are not limited thereto. The data signals illustrated in FIG. 5 are applied on the two pixel electrodes 103 in one pixel region respectively. When the gate driver outputs scan signal to the gate line 101 to turn on the two TFTs in one pixel region, the source driver applies data signals with opposite polarities to the two pixel electrodes 103, namely the two adjacent pixel electrodes 103, in one pixel region through the two adjacent data lines 102; the data signals with opposite polarities are alternating voltages in a positive period and a negative period respectively. The time sequences of the alternating voltages on the two adjacent pixel electrodes 103 are controlled to make alternating voltages on the two adjacent pixel electrodes 103 be in a positive period and a negative period respectively. Since the alternating voltages on the two pixel electrodes 103 in one pixel region are in a positive period and a negative period respectively, a horizontal electric field is formed due to the voltage difference between the two pixel electrodes 103, and it can control alignment directions of liquid crystal molecules in the liquid crystal layer 30.

In the embodiments of the present invention, the voltage difference between two pixel electrodes 103 in one pixel region is the difference between the high voltage in the positive period and the low voltage in the negative period of the alternating voltage. In the art of state, the constant voltage applied on the common electrode is generally an intermediate value between the high voltage in a positive period and the low voltage in a negative period of the alternating voltage applied onto the pixel electrode, and the voltage difference between the pixel electrode and the common electrode is about a half of the difference between the high voltage and the low voltage of the alternating voltage. Therefore, in order to obtain same strength of electric field in the liquid crystal layer, in the embodiments of the present invention, the difference between the high voltage and the low voltage of the alternating voltage applied on the two pixel electrodes 103 is about a half of the difference between the high voltage and the low voltage of the alternating voltage applied onto the pixel electrode in the art of state, which reduces the difference between the high voltage and the low voltage of the alternating voltage output by the source driver and saves energy consumption.

When the scan signal output by the gate drive circuit turn off the TFTs, the source driver stops applying data signals with opposite polarities to the two pixel electrodes 103, and when the gate driver turns off the TFTs, coupling capacitances generated by the two TFTs are fed back to the two pixel electrodes 103 in one pixel region respectively, causing both pixel electrodes 103 (alternating voltages thereof are in a positive period and a negative period respectively) to generate a voltage drop of $\Delta Vp$. As illustrated in FIG. 5, Vg denotes the scan signal applied onto a gate line, Vp1 and Vp2 denote the actual alternating voltages applied onto the two pixel electrodes 103 in one pixel region respectively, Vp1' and Vp2' denote the object alternating voltages applied on the pixel electrodes 103 respectively, wherein $\Delta Vp=Vp1'-Vp1=Vp2'-Vp2$. Since both pixel electrodes 103 generate the voltage drop of $\Delta Vp$ at the same time, self-compensation is realized, which ensures the balance and stabilization of the voltage difference between the two pixel electrodes 103, thereby effectively alleviating image retention of the displayed image.

In embodiments of the present invention, a horizontal electric field is formed between two pixel electrodes in one pixel region when data signals with opposite polarities are applied onto the two pixel electrodes; when the gate driver turns off the TFTs, the coupling capacitances generated by the two TFTs are fed back to the two pixel electrodes respectively to cause both pixel electrodes to generate a voltage drop of $\Delta Vp$, hence realizing self-compensation, which ensures the balance and stabilization of the voltage difference between the two pixel electrodes, and thus effectively alleviates image retention of display, and saves energy consumption by reducing the alternating voltage applied onto the pixel electrodes at the same time.

An embodiment of the present invention further provides a display device including the above-mentioned liquid crystal panel. The structure as illustrated in FIG. 4 may be used for the liquid crystal panel in the present embodiment. In the embodiments of the present invention, a horizontal electric field is formed between the two pixel electrodes by having the alternating voltages on the two pixel electrodes to be in a positive period and a negative period respectively; when the gate driver turns off the TFTs, both pixel electrodes generate voltage drops of $\Delta Vp$ to realize self-compensation, which ensures the balance and stabilization of the voltage difference between the two pixel electrodes, and thus effectively alleviates image retention of display, and saves energy consumption by reducing the alternating voltages applied onto the pixel electrodes at the same time.

The above embodiments are only for the purpose of describing technical proposal of the present invention rather than limiting it. While the present invention has been described in detail with reference to the above-mentioned embodiments, those of ordinary skill in the art should understand that they can modify the technical solution recorded in the above embodiments or conduct equivalent substitution for a part of technical features thereof and these modifications or substitutions will not make the nature of respective technical solution to depart from the spirit and scope of technical solutions of embodiments of the present invention.

The invention claimed is:

1. An array substrate comprising:
   a substrate; and
   a plurality of gate lines and a plurality of data lines formed on the substrate, two adjacent gate lines and two adjacent data lines intersecting each other to form a pixel region,
   wherein each the pixel region comprises two pixel electrodes and two thin film transistors (TFTs), drains of the two thin film transistors are connected with the two pixel electrodes respectively, sources of the two thin film transistors are connected with the two data lines respectively, and gates of the two thin film transistors are connected with one of the two gate lines;
   each of the two pixel electrodes consists of two sub-electrodes parallel to the gate lines and two sub-electrodes parallel to the data lines, the two sub-electrodes parallel to the gate lines of the two pixel electrodes are disposed in an interleaving manner with each other, and the two sub-electrodes parallel to the data lines of the two pixel electrodes are disposed in an interleaving manner with each other, one of the two sub-electrodes parallel to the gate lines is disposed close to one of the two adjacent gate lines, other of the two sub-electrodes parallel to the gate lines is disposed close to other of the two adjacent gate lines, one of the two sub-electrodes parallel to the data lines is disposed close to one of the two adjacent data lines, other of the two sub-electrodes parallel to the data lines is disposed close to other of the two adjacent data lines.

2. The array substrate of claim 1, wherein a material for the pixel electrodes comprises indium tin oxide or indium zinc oxide.

3. The array substrate of claim 1, further comprising:
   gate drivers connected with the gate lines to output scan signals to the gate lines; and
   source drivers connected with the data lines to output data signals to the data lines.

4. A liquid crystal panel comprising an array substrate, a color filter substrate and a liquid crystal layer encapsulated between the array substrate and the color filter substrate, the array substrate comprising:
   a plurality of gate lines and a plurality of data lines, two adjacent gate lines and two adjacent data lines intersecting each other to form one pixel region;
   source drivers connected with the data lines; and
   gate drivers connected with the gate lines,
   wherein each the pixel region comprises two pixel electrodes and two thin film transistors (TFTs), drains of the two thin film transistors are connected with the two pixel electrodes respectively, sources of the two thin film transistors are connected with the two data lines respectively, and gates of the two thin film transistors are connected with one of the two gate lines;
   each of the two pixel electrodes consists of two sub-electrodes parallel to the gate lines and two sub-electrodes parallel to the data lines, the two sub-electrodes parallel to the gate lines of the two pixel electrodes are disposed in an interleaving manner with each other, and the two sub-electrodes parallel to the data lines of the two pixel electrodes are disposed in an interleaving manner with each other, one of the two sub-electrodes parallel to the gate lines is disposed close to one of the two adjacent gate lines, other of the two sub-electrodes parallel to the gate lines is disposed close to other of the two adjacent gate lines, one of the two sub-electrodes parallel to the data lines is disposed close to one of the two adjacent data lines, other of the two sub-electrodes parallel to the data lines is disposed close to other of the two adjacent data lines.

5. The liquid crystal panel of claim 4, wherein an electric field formed between the two pixel electrodes in each of the pixel regions controls alignment direction of liquid crystal molecules in the liquid crystal layer.

6. The liquid crystal panel of claim 4, wherein data signals applied on the two adjacent data lines by the source drivers have opposite polarities.

7. The liquid crystal panel of claim 4, wherein a material for the pixel electrodes comprises indium tin oxide or indium zinc oxide.

8. A display device comprising the liquid crystal panel of claim 4.

9. The liquid crystal panel of claim 5, wherein data signals applied on the two adjacent data lines by the source drivers have opposite polarities.

10. The liquid crystal panel of claim 5, wherein a material for the pixel electrodes comprises indium tin oxide or indium zinc oxide.

11. The liquid crystal panel of claim 6, wherein a material for the pixel electrodes comprises indium tin oxide or indium zinc oxide.

* * * * *